US007369659B2

(12) United States Patent
Herbert

(10) Patent No.: US 7,369,659 B2
(45) Date of Patent: May 6, 2008

(54) ITEM HANDLING SYSTEM

(75) Inventor: Raymond John Herbert, Leigh-on-Sea (GB)

(73) Assignee: Neopost Limited, Essex (GB)

( * ) Notice: Subject to any disclaimer, the term of this patent is extended or adjusted under 35 U.S.C. 154(b) by 1176 days.

(21) Appl. No.: 09/931,160

(22) Filed: Aug. 17, 2001

(65) Prior Publication Data

US 2002/0027989 A1 Mar. 7, 2002

(30) Foreign Application Priority Data

Aug. 18, 2000 (GB) ................................ 0020268.9

(51) Int. Cl.
*G09C 1/06* (2006.01)
*G09C 3/00* (2006.01)

(52) U.S. Cl. ............................ 380/55; 380/54; 380/56

(58) Field of Classification Search .................. 380/55, 380/56, 54

See application file for complete search history.

(56) References Cited

U.S. PATENT DOCUMENTS

| | | | |
|---|---|---|---|
| 4,641,347 | A | 2/1987 | Clark et al. |
| 5,862,243 | A | 1/1999 | Baker et al. |

FOREIGN PATENT DOCUMENTS

| | | |
|---|---|---|
| EP | 0356228 | 2/1990 |
| EP | 0851373 | 7/1998 |

OTHER PUBLICATIONS

On-line control of the colour printing quality by image processing Yu Xiaohan; Sodergard, C.; Yla-Jaaski, J.; Tencon '93. Proceedings. Computer, Communication, Control and Power Engineering. 1993 IEEE Region 10 Conference on Issue 0, Part 20000, Oct. 19-21, 1993 pp. 1039-1041 vol. 2.*

Distortion for readability of contextualized text explanations for visualizations Chigona, W.; Strothotte, T.; Information Visualisation, 2002. Proceedings. Sixth International Conference on Jul. 10-12, 2002 pp. 289-294.*

Automatic determination of text readability over textured backgrounds for augmented reality systems Leykin, A.; Tuceryan, M.; Mixed and Augmented Reality, 2004. ISMAR 2004. Third IEEE and ACM International Symposium on Nov. 2-5, 2004 pp. 224-230.*

Image quality and readability Govindaraju, V.; Srihari, S.N.; Image Processing, 1995. Proceedings., International Conference on vol. 3; Oct. 23-26, 1995 pp. 324-327 vol. 3.*

* cited by examiner

*Primary Examiner*—David Jung
(74) *Attorney, Agent, or Firm*—Shoemaker and Mattare

(57) ABSTRACT

An item handling system, comprising: at least one item preparation station for printing machine-readable symbols on items; and at least one item handling station for receiving items from the at least one item preparation station and being operable to machine read and process information contained in the symbols printed on the items; wherein: the at least one item handling station includes a messaging unit for generating messages representative of the readability of symbols read thereby and transmitting the messages to the at least one item preparation station; and the at least one item preparation station includes an indicator for providing an indication of a readability of symbols printed thereby in response to messages received from the at least one item handling station.

50 Claims, 3 Drawing Sheets

ITEM HANDLING SYSTEM

BACKGROUND OF THE INVENTION

The present invention relates to an item handling system, in particular an item handling system for providing an indication of the readability of machine-readable symbols printed by an item preparation station, thereby enabling control of the quality of printed symbols. The present invention finds particular application as a mail handling system in handling mail items.

Mail items for which postal charges are metered by postage metering apparatus receive an imprint of a postage indicium from the postage metering apparatus to evidence that accounting has been effected in respect of the postal charge for the mail item.

Traditionally, postage metering apparatus have been arranged to print a relatively simple form of indicium comprising a graphic design and items of postal information. The postal information usually comprises an identification of the postage metering apparatus, an identification of the postal depot receiving the mail items from the mailer, the postal charge and the date of mailing. This relatively simple form of postage indicium enables a human visual check of mail items to determine that postal charges have been accounted for by the postage metering apparatus. As these printed postage indicia are only subject to a visual check, the quality of the imprint has not to date been critical, provided that the quality of the imprint is sufficient to enable the personnel at the postal depot to determine that an imprint had been applied and read the amount of the postal charge to determine that the correct postal charge for the mail item has been applied.

With the advent of the use of digital printing techniques for printing postage indicia, and a desire to provide security against fraudulent printing of postage indicia, it is now proposed to include additional information in the postage indicia. This additional information includes cryptographic information that can be used to verify the authenticity of the printed postage indicia and enable the automation of the reading of the information in the indicia and the verification of the indicia. Accordingly, it is necessary that the quality of the imprint of the postage indicia be maintained at a sufficient level as to ensure successful machine reading of the information in the postage indicia. Mail handling authorities and operators are seeking to achieve 100% readability of postage indicia printed on mail items. However, imperfections can occur in the imprint of the postage indicia which result in the machine-reading equipment being incapable of unambiguously reading the information in the printed postage indicia on every mail item, and, moreover, these imperfections which affect the machine readability of printed postage indicia often/ would not be evident from a human visual inspection.

Various factors can affect the quality of the imprints of postage indicia, and hence the machine readability of printed postage indicia. One factor is a restricted supply of the ink used to form imprints on mail items, for example, owing to a low level of ink in an ink supply to the printer. For example, where an ink-jet printer is used in a postage metering apparatus to print the postage indicia, after substantial use of an ink-jet print cartridge, the ink supply to the ink-jet nozzles may be so depleted as to result in poor quality printing of the indicia or the ink-jet nozzles may become partially or totally blocked such that dots required to print the postage indicia are only partially formed or are wholly absent. Another factor is the improper installation of print cartridges in postage metering apparatus. With ink-jet print cartridges, this results in poor electrical connections to the print cartridges or even lack of connection to some of the electrical terminals of the print cartridges. As a result, ones of the ink-jet nozzles may not be operative. Improper installation of print cartridges can also result in misalignment of the ink-jet nozzles such that printed dots forming the postage indicia imprint are misaligned and the postage indicia imprint is distorted. Another factor is the kind of material of the mail items. The quality of the imprint is dependent upon the use of mail items, for example envelopes, formed of a material which is suited to the particular technique used in printing the postage indicia.

Whilst all of these factors are under the control of a human operator and corrective action could be taken by the operator, the printing of machine-readable symbols in printed indicia which are of a quality which is significantly lower than that desired may not be evident to the human operator from a visual inspection. Thus, a human operator would probably not be able to determine that the quality of an imprint is lower than that desired for machine readability, particularly where the quality is only marginally lower than that desired.

It is thus an aim of the present invention to provide an item handling system, an item preparation station and an item handling station which provide an indication as to the readability of printed machine-readable symbols, thereby enabling control of the quality of printed symbols.

SUMMARY OF THE INVENTION

In one aspect the present invention provides an item handling system, comprising: at least one item preparation station for printing machine-readable symbols on items; and at least one item handling station for receiving items from the at least one item preparation station and being operable to machine read and process information contained in the symbols printed on the items; wherein: the at least one item handling station includes a messaging unit for generating messages representative of the readability of symbols read thereby and transmitting the messages to the at least one item preparation station; and the at least one item preparation station includes an indicator for providing an indication of a readability of symbols printed thereby in response to messages received from the at least one item handling station.

Preferably, the symbols are two-dimensional symbols.

Preferably, the symbols include information evidencing payment.

Preferably, the symbols include information identifying the at least one item preparation station which printed the same.

Preferably, the messages categorize the readability of symbols into one of a plurality of categories according to a level of readability.

Preferably, the indicator of the at least one item preparation station is configured to provide an indication of a probable cause of a reduced level of readability of symbols.

More preferably, the probable cause includes at least one of a low amount of printing medium, a defective print head, improper print head installation and improper material of the items.

Preferably, the at least one item preparation station is configured to be disabled where the level of readability of symbols printed thereby is below a predeterminable level.

More preferably, the at least one item preparation station is configured to be disabled where the level of readability of a predeterminable number of symbols printed thereby is below a predeterminable level in a predeterminable period of time.

Preferably, the system further comprises: a service center for logging service requests for item preparation stations; and wherein the system is configured to log a service request at the service center where the level of readability of symbols printed by the at least one item preparation station is below a predeterminable level.

More preferably, the system is configured to log a service request at the service center where the level of readability of a predeterminable number of symbols printed by the at least one item preparation station is below a predeterminable level in a predeterminable period of time.

Preferably, the at least one item preparation station is configured to prepare items as batches of items, and the messaging unit of the at least one item handling station is configured to generate messages representative of the readability of symbols on items from respective ones of batches of items.

More preferably, a message categorizes the readability of symbols on items from a batch of items into one of a plurality of categories such as to provide an indication as to the numbers of items in each category.

Preferably, the indicator of the at least one item preparation station includes a display and the indication is a visual indication.

Preferably, the at least one item preparation station and the at least one item handling station are remotely located.

More preferably, the at least one item preparation station and the at least one item handling station are configured to communicate by a remote communications link.

Preferably, each message forms part of a response message or a sequence of grouped messages.

In one embodiment the system comprises: a plurality of item preparation stations; and wherein the at least one item handling station is configured to transmit messages to the ones of the item preparation stations which prepared the respective items.

Preferably, the system comprises: a plurality of item handling stations.

In another embodiment the system comprises: a plurality of item preparation stations; and a plurality of item handling stations; and wherein the item handling stations are configured to transmit messages to the ones of the item preparation stations which prepared the respective items.

Preferably, the items are mail items.

More preferably, any or each item preparation station comprises a postage meter.

In another aspect the present invention provides an item preparation station for printing machine-readable symbols on items, including an indicator for providing an indication of the readability of symbols printed thereby in response to messages, representative of the readability of the symbols, received from at least one item handling station.

Preferably, the symbols are two-dimensional symbols.

Preferably, the symbols include information evidencing payment.

Preferably, the messages categorize the readability of symbols into one of a plurality of categories according to a level of readability.

Preferably, the indicator is configured to provide an indication of a probable cause of a reduced level of readability of symbols.

More preferably, the probable cause includes at least one of a low amount of printing medium, a defective print head, improper print head installation and improper material of the items.

Preferably, the item preparation station is configured to be disabled where the level of readability of symbols printed thereby is below a predeterminable level.

More preferably, the item preparation station is configured to be disabled where the level of readability of a predeterminable number of symbols printed thereby is below a predeterminable level in a predeterminable period of time.

Preferably, the item preparation station is configured to prepare items as batches of items, and the messages are representative of the readability of symbols on items from respective ones of batches of items.

More preferably, a message categorizes the readability of symbols on items from a batch of items into one of a plurality of categories such as to provide an indication as to the numbers of items in each category.

Preferably, the indicator includes a display and the indication is a visual indication.

Preferably, each message forms part of a response message or a sequence of grouped messages.

Preferably, the items are mail items.

More preferably, the item preparation station comprises a postage meter.

The present invention also extends to an item preparation system, comprising: the above-described item preparation station; and a service center for logging service requests for the item preparation station; wherein the item preparation station is configured to log a service request at the service center where the level of readability of symbols printed thereby is below a predeterminable level.

Preferably, the item preparation station is configured to log a service request at the service center where the level of readability of a predeterminable number of symbols printed thereby is below a predeterminable level in a predeterminable period of time.

In a further aspect the present invention provides an item handling station for receiving items from at least one item preparation station, comprising: a machine-reading unit for machine reading and processing information contained in symbols printed on the items; and a messaging unit for generating messages representative of the readability of symbols read thereby and transmitting the messages to the at least one item preparation station.

Preferably, the symbols are two-dimensional symbols.

Preferably, the symbols include information evidencing payment.

Preferably, the symbols include information identifying the at least one item preparation station which printed the same.

Preferably, the messages categorize the readability of symbols into one of a plurality of categories according to the level of readability.

Preferably, the at least one item preparation station is configured to prepare items as batches of items, and the messaging unit is configured to generate messages representative of the readability of symbols on items from respective ones of batches of items.

Preferably, a message categorizes the readability of symbols on items from a batch of items into one of a plurality of categories such as to provide an indication as to the numbers of items in each category.

Preferably, the item handling station is configured to receive items from a plurality of item preparation stations and transmit messages to the ones of the item preparation stations which prepared the respective items.

Preferably, each message forms part of a response message or a sequence of grouped messages.

Preferably, the items are mail items.

The present invention also extends to an item handling system, comprising: the above-described item handling station; and a service center for logging service requests for item preparation stations; wherein the item handling station is configured to log a service request at the service center for an item preparation station where the level of readability of symbols printed by the item preparation station is below a predeterminable level.

Preferably, the item handling station is configured to log a service request at the service center where the level of readability of a predeterminable number of symbols printed by the item preparation station is below a predeterminable level in a predeterminable period of time.

BRIEF DESCRIPTION OF THE DRAWINGS

Preferred embodiments of the present invention will now be described hereinbelow by way of example only with reference to the accompanying drawings, in which.

DESCRIPTION OF THE PREFERRED EMBODIMENTS

Figure 1:
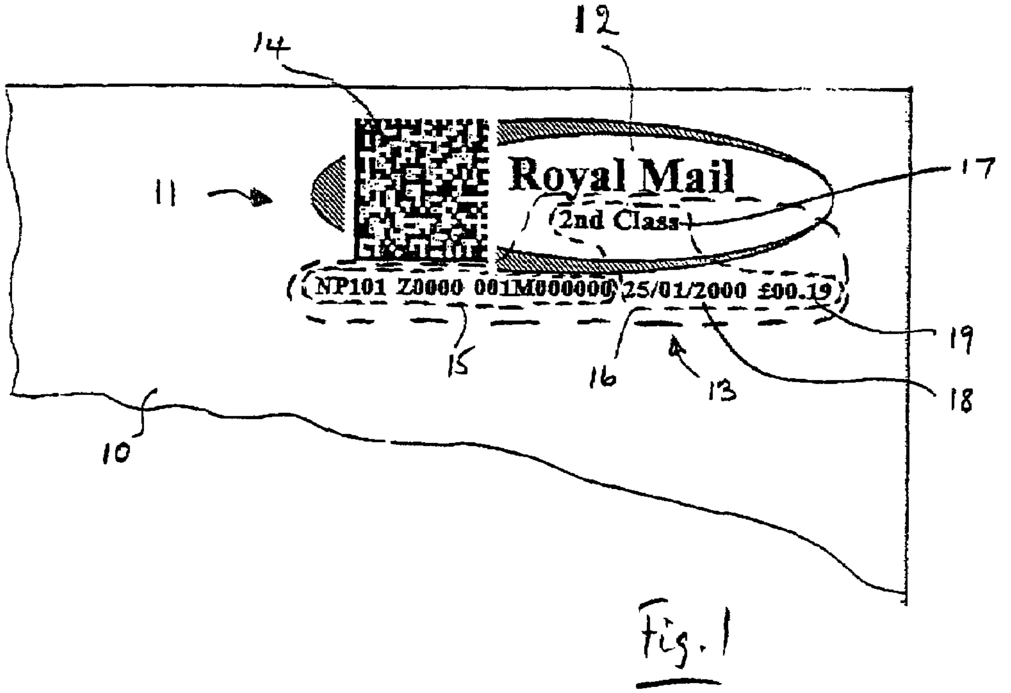
FIG. 1 illustrates part of a mail item bearing an imprint of a postage indicium.

Referring to FIG. 1, a mail item 10 includes a postage indicium 11 printed thereon by a postage metering apparatus in a form authorised by a postal authority. In the exemplified postage indicium 11, the postal authority is the Royal Mail.

The postage indicium 11 includes a graphic design 12 incorporating a designation of the postal authority, human visually-readable postal data 13, and a machine-readable symbol 14.

The postal data 13 includes postal data items 15 comprising an identification of the supplier of the postage metering apparatus used to print the postage indicium 11, an identification of the serial number of the postage metering apparatus used to print the postage indicium 1l, an identification of the batch of mail items where the mail item 10 is one of a batch and an item number for the mail item 10.

The postal data 13 further includes postal data items 16 comprising the class of mail 17, the date of posting 18 and the postal charge 19 applied to the mail item 10.

The symbol 14, in this embodiment a 2D symbol, for example a datamatrix symbol, includes cryptographic data, for example, a digital signature or encryption of postal data 13, for enabling the authenticity of the postage indicium 11 to be verified by a third party. In this embodiment the third party is the postal authority.

The elements of the postage indicium 11, other than the symbol 14, are humanly-visually readable, and thus the print quality of those elements can be determined by human visual inspection. However, as the symbol 14 is a machine-readable symbol, a determination as to whether the quality of the imprint of the symbol 14 is sufficient to enable a required level of machine readability to be attained cannot be made by visual inspection.

Figure 2:
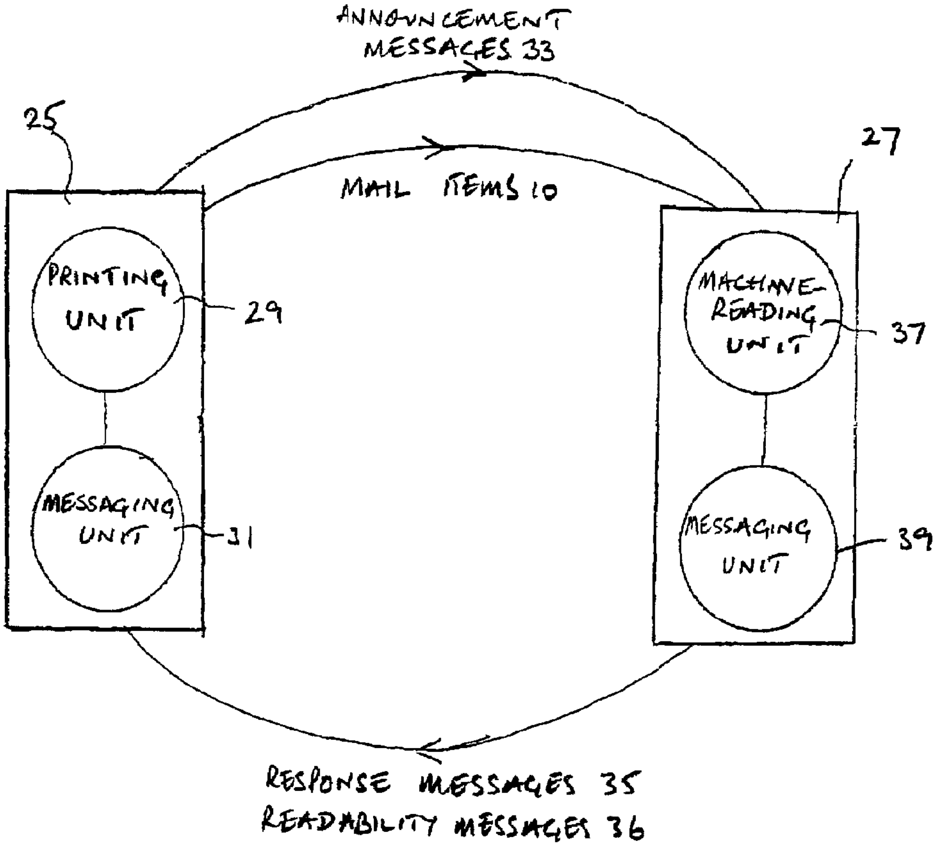
FIG. 2 diagrammatically illustrates a mail handling system in accordance with a first embodiment of the present invention.

FIG. 2 diagrammatically illustrates a mail handling system in accordance with a first embodiment of the present invention.

The mail handling system comprises at least one mail preparation station 25, in this embodiment postage metering apparatus, for printing postage indicia 11 on mail items 10, and at least one mail handling station 27, in this embodiment postal authority centers, for receiving mail items 10 from the at least one mail preparation station 25 and handling the mail items 10 so received.

The at least one mail preparation station 25 comprises a printing unit 29 for printing postage indicia 11 on mail items 10, and a messaging unit 31 for transmitting announcement messages 33 to the at least one mail handling station 27, receiving messages 35, 36 from the at least one mail handling station 29 and providing an indication, in this embodiment displayed, of the readability of symbols 14 in postage indicia 11 printed thereby. In this embodiment the messaging unit 31 includes a display for displaying the indication of the readability of the printed symbols 14.

The at least one mail handling station 29 comprises a machine-reading unit 37 for machine reading and processing information contained in the symbols 14 in postage indicia 11 read thereby, and a messaging unit 39 for receiving announcement messages 33 from the at least one mail handling station 25 and transmitting response messages 35 and readability messages 36 representative of the readability of symbols 14 in postage indicia 11 read thereby. In this embodiment the readability messages 36 are transmitted separately of other response messages 35. In other embodiments the readability messages 36 could be transmitted as parts of response messages 35 or as parts of sequences of grouped messages including response messages 35.

The operation of the mail handling system will now be described hereinbelow.

A batch of mail items 10 is prepared by the at least one mail preparation station 25 for handling by the at least one mail handling station 27. In preparing a batch of mail items 10, the postal charges for the mail items 10 are determined, these postal charges are accounted for, postage indicia 11, as illustrated in FIG. 1, unique to each mail item 10 are generated for each mail item 10, and the postage indicia 11 are printed on the respective mail items 10 by the printing unit 29.

One or more announcement messages 33 relating to batches of mail items 10 are transmitted from the at least one mail preparation station 25 to the at least one mail handling station 27. The one or more announcement messages 33 provide information to the postal authority relating to batches of mail items 10 which have been prepared and are ready for handling by the postal authority and to batches of mail items 10 which are in the course of preparation but have not yet been completed. The batches of mail items 10 are transported from the at least one mail preparation station 25 to the at least one mail handling station 27.

One or more response messages 35 are transmitted from the at least one mall handling station 27 to the at least one mail preparation station 25. The one or more response messages 35 acknowledge receipt of the one or more announcement messages 33 and also relate to the receipt and acceptance of the actual batches of mail items 10. Copending European patent application Ser. No. 01304798.0 (filed 31 May 2001) and U.S. patent application Ser. No. 09/867, 763 (filed 31 May 2001 in the name of Gawler and entitled “Mail Preparation System”), which are incorporated herein by reference, relate to a mail preparation system and contain a more detailed description relating both to the announcement messages 33 and the response messages 35, and the display of the status of those messages 33, 35.

A batch of mail items 10 received at the at least one mail handling station 27 is then processed at the least one mail handling station 27. The postage indicia 11 on the mail items 10 are machine read by the machine-reading unit 37 to obtain the postal data 13 and other information contained in the symbol 14 for each mail item 10. In this mail handling step, in addition to obtaining the postal data 13 and other information by machine reading the symbol 14, the postal data 13 is verified using the cryptographic information read from the postage indicium 11.

Where the quality of the printed indicia 11 on the mail items 10 is sufficiently high, the machine-reading unit 37 is capable of reading all of the machine-readable information contained in the symbols 14. If, however, the quality of the printed indicia 11 is not sufficiently high, the machine-reading unit 37 may be incapable of correctly reading all of the machine-readable information contained in the symbols 14.

The machine-reading unit 37 utilises algorithms to read and process information read from a symbol 14; the information contained in a symbol 14 including error correction bits. Where a symbol 14 is printed with sufficient quality, the reading and processing of the information does not require reference to the error correction bits. Where, however, a symbol 14 is not of sufficient quality, for example, where one or more elements of the symbol 14 are missing, damaged or otherwise imperfect, the error correction bits have to be utilised in an attempt to read and process the information contained in the symbol 14.

As discussed hereinabove, imperfections in printed symbols 14 may arise due a number of different factors, including an insufficient supply of ink to the printing unit 29 used to print the postage indicia 11, a defective print head, typically partially or wholly blocked ink-jet print nozzles in an ink-jet printer, improper installation of a print cartridge and the use of mail items 10, typically envelopes, formed of a material unsuited to the printing technique. All of these factors are within the control of an operator of the at least one mail preparation station 25, and hence, if any one or more of these factors result in the printing of defective symbols 14 on mail items 10, the operator could make corrections to ensure that the symbols 14 are printed with a sufficiently high quality as to readable by the machine-reading unit 37 at the least one mail handling station 27.

The machine-reading unit 37 determines the readability of symbols 14 read thereby. In this embodiment the machine-reading unit 37 includes means which utilises the output of one or more of the algorithms used in reading and processing the information included in a symbol 14, to determine information relating to the readability of the symbol 14. The information relating to the readability of symbols 14 printed on mail items 10 of a batch of mail items 10 is formatted to create a readability message 36 which is transmitted to the respective mail preparation station 25 which printed the indicia 11 including the symbols 14.

The mail preparation station 25 which receives the readability message 36 then displays information indicative of the level of the readability of the printed symbols 14 in a batch of mail items 10 printed thereby.

As mentioned hereinabove, and described in the above-mentioned co-pending European and U.S. patent applications, a horizontal strip is displayed for each batch of mail items 10, with sections in the strip being allocated to each message. The colour of any section provides an indication as to the status of a message and, as the status of the corresponding message changes, the colour of the section is changed to indicate the new, current status of the message. In one embodiment the readability message 36 relating to a batch of mail items 10 is allocated a section in the display separate from other response messages 35 and that section can be arranged to display a colour indicative of the readability of the printed symbols 14 or to display a numeral indicative of the readability of the printed symbols 14. Thus, the operator of the respective mail preparation station 25 is provided with a clear indication as to the level of readability of the printed symbols 14 in each batch of mail items 10. When the display indicates that the required level of reading is not being attained, the operator is alerted to investigate the reason for the printed symbols 14 not being read to the required level, and, where possible, effect corrective action.

The readability message 36 may be a message separate from other response messages 35 or the readability information may be included in a response message 35 relating to the acceptance of a batch of mail items 10 by the postal authority. In one embodiment the indication of the readability of the printed symbols 14 is displayed separately from the status information relating to other response messages 35. In another embodiment the indication of the readability of the printed symbols 14 is displayed together with the information relating to the status of the response messages 35.

In one embodiment the readability message 36 contains readability information that has a range of values, for example from 1 to 10, providing an indication of the readability of the machine-readable information. In one preferred embodiment the readability message 36 may contain information indicative of the number of mail items 10 in a batch of mail items 10 for which the machine-readable imprint has a readability falling within each value in the range of readability. For example, the readability message 36 may indicate that the postage indicia 11 on 50 of the mail items 10 have a readability value of 5 and that the postage indicia 11 on 1000 of the mail items 10 have a readability value of 7.

In this embodiment the symbols 14 are 2D symbols. In an alternative embodiment the symbols 14 may be optical character recognition (OCR) characters.

In one embodiment the at least one mail preparation station 25 could be configured to inhibit the printing of further indicia 11 in response to receipt of a readability message 36 which indicates that the readability of the printed symbols 14 is lower than a predetermined level. This would then require the operator or other service personnel to perform the required corrections to ensure that a required level of readability is attained.

It will be appreciated that the utilisation of the machine-reading unit 37 to read and process information contained in printed symbols 14 to determine the readability of the symbols 14 is advantageous in that operational characteristics of the machine-reading unit 37 are taken into account in determining the readability of the symbols 14, and the mail handling system together with the operator provides a closed-loop print control system.

In a preferred embodiment the machine-reading unit 37 can be configured to take further actions in determining the readability of imprinted symbols 14 on mail items 10. Prior to sending a readability message 36, the machine-reading unit 37 can perform a verification check against known standards, particularly if the machine-reading unit 37 determines that the readability of a batch of mail items 10 is poor. If desired, the readability of known standards may be determined periodically by the machine-reading unit 37, for example, daily or at other intervals, based either on time or the number of reading operations performed by the machine-reading unit 37, in order to verify that the machine-reading unit 37 is operating correctly.

Figure 3:
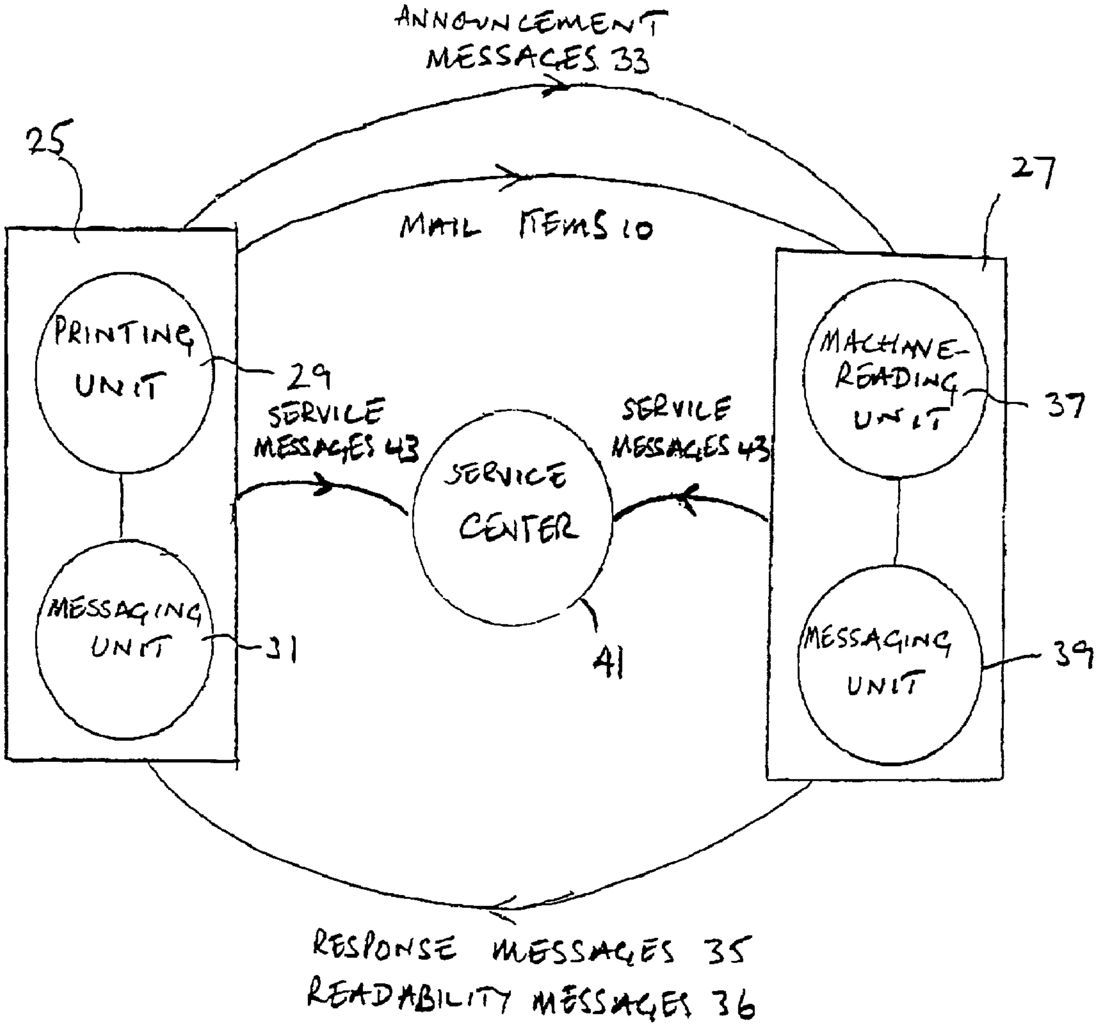
FIG. 3 diagrammatically illustrates a mail handling system in accordance with a second embodiment of the present invention.

FIG. 3 illustrates a mail handling system in accordance with a second embodiment of the present invention.

The mail handling system of this embodiment is substantially identical to the mail handling system of the above-described embodiment, and thus, in order to avoid unnecessary duplication of description, only the differences will be described in detail, with like reference signs designating like parts.

The mail handling system of this embodiment differs from that of the above-described embodiment only in further comprising a service center 41 for logging service requests for the at least one mail preparation station 25, and in that the messaging units 31, 39 of one or both of the at least one mail preparation station 25 and the at least one mail handling station 27 are configured to transmit service request messages 43 automatically to the service center 41 where the at least one mail handling station 27 determines that the level of readability of symbols 14 printed by the at least one mail preparation station 25 is below a predeterminable level. In a preferred embodiment a service request is logged at the service center 41 where the level of readability of a predetermined number of symbols 14 printed by the at least one mail preparation station is below a predetermined level in a predetermined period of time.

Figure 4:
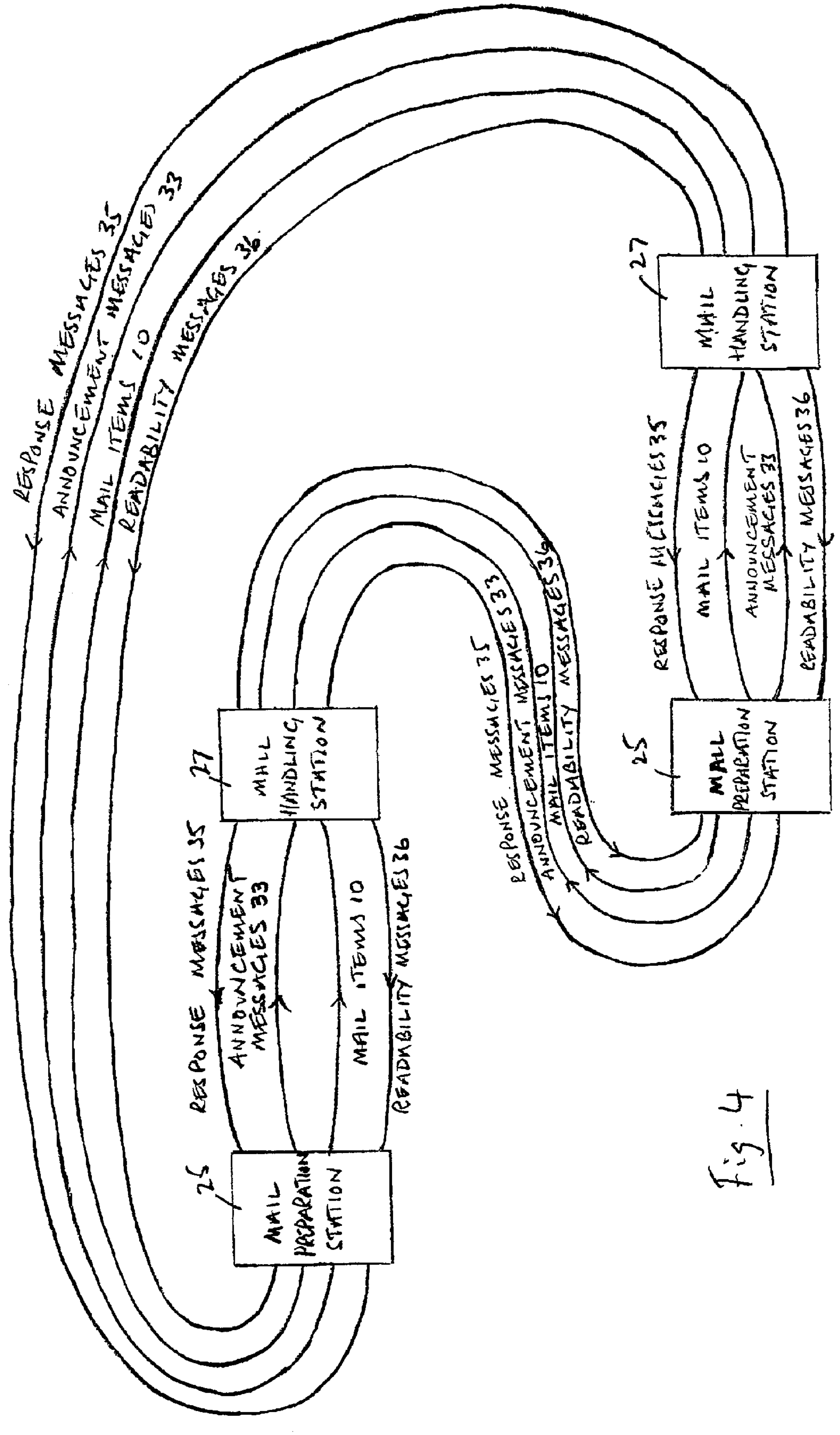
FIG. 4 diagrammatically illustrates a mail handling system in accordance with a third embodiment of the present invention.

FIG. 4 illustrates a mail handling system in accordance with a third embodiment of the present invention.

The mail handling system of this embodiment differs from the mail handling system of the first embodiment in comprising a plurality of mail preparation stations 25 and a plurality of mail handling stations 27, each in communication with one another. The mail preparation stations 25 and the mail handling stations 27 are identical to those of the above-described embodiments and operate in the same manner, and thus, in or order to avoid unnecessary duplication of description, only the differences will be described in detail, with like reference signs designating like parts.

The mail handling system of this embodiment differs only in that mail items 10 prepared by any of the mail preparation stations 25 can be delivered to any of the mail handling stations 27, irrespective of whether the mail items 10 are individual mail items 10 or mail items 10 from a batch of mail items, and in that the generated readability messages 36 are transmitted to the respective ones of the mail preparation stations 25 which printed the symbols 14 on the mail items 10.

Finally, it will be understood that the present invention has been described in its preferred embodiments and can be modified in many different ways without departing form the scope of the invention as defined by the appended claims.

For example, while the preferred embodiments of the present invention are described in relation to a mail handling system, it will be appreciated that the print quality control system of the present invention may be utilised in checking the machine readability of imprints applied to articles other than mail items.

The invention claimed is:

1. An item handling system, comprising:

at least one item preparation station for printing machine-readable symbols on items; and at least one item handling station for receiving items from the at least one item preparation station and being operable to machine read and process information contained in the symbols printed on the items;

wherein:

the at least one item handling station includes a messaging unit for generating messages representative of the readability of symbols read thereby and transmitting the messages to the at least one item preparation station; and the at least one item preparation station includes an indicator for providing an indication of a readability of symbols printed thereby in response to messages received from the at least one item handling station.

2. The system of claim l, wherein the symbols are two-dimensional symbols.

3. The system of claim 1, wherein the symbols include information evidencing payment.

4. The system of claim 1, wherein the symbols include information identifying the at least one item preparation station which printed the same.

5. The system of claim 1, wherein the messages categorize the readability of symbols into one of a plurality of categories according to a level of readability.

6. The system of claim 1, wherein the indicator of the at least one item preparation station is configured to provide an indication of a probable cause of a reduced level of readability of symbols.

7. The system of claim 6, wherein the probable cause includes at least one of a low amount of printing medium, a defective print head, improper print head installation and improper material of the items.

8. The system of claim 1, wherein the at least one item preparation station is configured to be disabled where the level of readability of symbols printed thereby is below a predeterminable level.

9. The system of claim 8, wherein the at least one item preparation station is configured to be disabled where the level of readability of a predeterminable number of symbols printed thereby is below a predeterminable level in a predeterminable period of time.

10. The system of claim 1, further comprising:

a service center for logging service requests for item preparation stations;

and wherein the system is configured to log a service request at the service center where the level of readability of symbols printed by the at least one item preparation station is below a predeterminable level.

11. The system of claim 10, wherein the system is configured to log a service request at the service center where the level of readability of a predeterminable number of symbols printed by the at least one item preparation station is below a predeterminable level in a predeterminable period of time.

12. The system of claim 1, wherein the at least one item preparation station is configured to prepare items as batches of items, and the messaging unit of the at least one item handling station is configured to generate messages representative of the readability of symbols on items from respective ones of batches of items.

13. The system of claim 12, wherein a message categorizes the readability of symbols on items from a batch of items into one of a plurality of categories such as to provide an indication as to the numbers of items in each category.

14. The system of claim 1, wherein the indicator of the at least one item preparation station includes a display and the indication is a visual indication.

15. The system of claim 1, wherein the at least one item preparation station and the at least one item handling station are remotely located.

16. The system of claim 15, wherein the at least one item preparation station and the at least one item handling station are configured to communicate by a remote communications link.

17. The system of claim 1, wherein each message forms part of a response message or a sequence of grouped messages.

18. The system of claim 1, comprising:

a plurality of item preparation stations;

and wherein the at least one item handling station is configured to transmit messages to the ones of the item preparation stations which prepared the respective items.

19. The system of claim 1, comprising:

a plurality of item handling stations.

20. The system of claim 1, comprising:

a plurality of item preparation stations; and a plurality of item handling stations;

and wherein the item handling stations are configured to transmit messages to the ones of the item preparation stations which prepared the respective items.

21. The system of claim 1, wherein the items are mail items.

22. The system of claim 21, wherein any or each item preparation station comprises a postage meter.

23. An item preparation station for printing machine-readable symbols on items, including an indicator for providing an indication of the readability of symbols printed thereby in response to messages, representative of the readability of the symbols, received from at least one item handling station.

24. The station of claim 23, wherein the symbols are two-dimensional symbols.

25. The station of claim 23, wherein the symbols include information evidencing payment.

26. The station of claim 23, wherein the messages categorize the readability of symbols into one of a plurality of categories according to a level of readability.

27. The station of claim 23, wherein the indicator is configured to provide an indication of a probable cause of a reduced level of readability of symbols.

28. The station of claim 27, wherein the probable cause includes at least one of a low amount of printing medium, a defective print head, improper print head installation and improper material of the items.

29. The station of claim 23, wherein the item preparation station is configured to be disabled where the level of readability of symbols printed thereby is below a predeterminable level.

30. The station of claim 29, wherein the item preparation station is configured to be disabled where the level of readability of a predeterminable number of symbols printed thereby is below a predeterminable level in a predeterminable period of time.

31. The station of claim 23, wherein the item preparation station is configured to prepare items as batches of items, and the messages are representative of the readability of symbols on items from respective ones of batches of items.

32. The station of claim 31, wherein a message categorizes the readability of symbols on items from a batch of items into one of a plurality of categories such as to provide an indication as to the numbers of items in each category.

33. The station of claim 23, wherein the indicator includes a display and the indication is a visual indication.

34. The station of claim 23, wherein each message forms part of a response message or a sequence of grouped messages.

35. The station of claim 23, wherein the items are mail items.

36. The station of claim 35, wherein the item preparation station comprises a postage meter.

37. An item preparation system, comprising:

the item preparation station of claim 23; and a service center for logging service requests for the item preparation station;

wherein the item preparation station is configured to log a service request at the service center where the level of readability of symbols printed thereby is below a predeterminable level.

38. The system of claim 37, wherein the item preparation station is configured to log a service request at the service center where the level of readability of a predeterminable number of symbols printed thereby is below a predeterminable level in a predeterminable period of time.

39. An item handling station for receiving items from at least one item preparation station, comprising:

a machine-reading unit for machine reading and processing information contained in symbols printed on the items; and a messaging unit for generating messages representative of the readability of symbols read thereby and transmitting the messages to the at least one item preparation station.

40. The station of claim 39, wherein the symbols are two-dimensional symbols.

41. The station of claim 39, wherein the symbols include information evidencing payment.

42. The station of claim 39, wherein the symbols include information identifying the at least one item preparation station which printed the same.

43. The station of claim 39, wherein the messages categorize the readability of symbols into one of a plurality of categories according to the level of readability.

44. The station of claim 39, wherein the at least one item preparation station is configured to prepare items as batches of items, and the messaging unit is configured to generate messages representative of the readability of symbols on items from respective ones of batches of items.

45. The station of claim 44, wherein a message categorizes the readability of symbols on items from a batch of items into one of a plurality of categories such as to provide an indication as to the numbers of items in each category.

46. The station of claim 39, wherein the item handling station is configured to receive items from a plurality of item preparation stations and transmit messages to the ones of the item preparation stations which prepared the respective items.

47. The station of claim 39, wherein each message forms part of a response message or a sequence of grouped messages.

48. The station of claim 39, wherein the items are mail items.

49. An item handling system, comprising:

the item handling station of claim 39; and a service center for logging service requests for item preparation stations;

wherein the item handling station is configured to log a service request at the service center for an item preparation station where the level of readability of symbols printed by the item preparation station is below a predeterminable level.

50. The system of claim 49, wherein the item handling station is configured to log a service request at the service center where the level of readability of a predeterminable number of symbols printed by the item preparation station is below a predeterminable level in a predeterminable period of time.

* * * * *